(12) United States Patent
Harris et al.

(10) Patent No.: US 6,884,343 B2
(45) Date of Patent: Apr. 26, 2005

(54) CURB INLET CATCH BASIN FILTER

(76) Inventors: John F. Harris, 1464 Ridge View Pl. NW., Albany, OR (US) 97321; Ardle E. Page, 1455 Center St., Albany, OR (US) 97321

( * ) Notice: Subject to any disclaimer, the term of this patent is extended or adjusted under 35 U.S.C. 154(b) by 74 days.

(21) Appl. No.: 09/949,225

(22) Filed: Sep. 7, 2001

(65) Prior Publication Data

US 2003/0047497 A1 Mar. 13, 2003

(51) Int. Cl.[7] .................................................. E03F 5/14
(52) U.S. Cl. ........................ 210/163; 210/238; 210/479; 404/4
(58) Field of Search ................................ 210/163, 164, 210/170, 232, 238, 477, 478, 451, 452, 479, 480; 404/4, 5

(56) References Cited

U.S. PATENT DOCUMENTS

| 809,201 | A | * | 1/1906 | Lutz ........................... 210/163 |
|---|---|---|---|---|
| 4,594,157 | A | | 6/1986 | McGowan .................. 210/163 |
| 5,403,474 | A | | 4/1995 | Emery ......................... 210/163 |
| 5,405,539 | A | * | 4/1995 | Schneider ................... 210/170 |
| 5,575,925 | A | | 11/1996 | Logue, Jr. ................... 210/164 |
| 5,954,952 | A | | 9/1999 | Strawser, Sr. ............... 210/164 |
| 5,985,157 | A | * | 11/1999 | Leckner et al. ............. 210/163 |
| 6,015,489 | A | | 1/2000 | Allen et al. ................. 210/163 |
| 6,086,758 | A | * | 7/2000 | Schilling et al. ............ 210/164 |
| 6,106,706 | A | | 8/2000 | Roy et al. ................... 210/164 |
| 6,149,803 | A | * | 11/2000 | DiLoreto, Jr. et al. ...... 210/164 |
| 6,254,770 | B1 | * | 7/2001 | Remon ........................ 210/164 |

OTHER PUBLICATIONS

Drain Pack™ shows in their brochure(see copy) a basket within a curb inlet catch basin.

* cited by examiner

Primary Examiner—Christopher Upton
(74) Attorney, Agent, or Firm—Robert K. Lau

(57) ABSTRACT

This invention is a filter for a street curb inlet catch basin that comprises a removable filter basket assembly, a funnel to channel storm water into the basket, and a support structure that holds the filter in place within the basin by means of bracing the structure against the basins interior walls without altering the interior walls of the basin.

2 Claims, 5 Drawing Sheets

CURB INLET CATCH BASIN FILTER

CROSS-REFERENCE TO RELATED APPLICATIONS

Not Applicable

STATEMENT REGARDING FEDERALLY SPONSORED RESEARCH

Not Applicable

SEQUENCE LISTING

Not Applicable

BACKGROUND OF THE INVENTION

1. Field of the Invention

This invention relates to a filter with a support structure for placing a filter inside of a street curb inlet catch basin below and down stream from the basin's curb inlet.

2. Description of the Prior Art

The inlet is typically in the curb of a street. Storm water flows off the street, down the gutter, through the curb inlet, then into the catch basin, and out the basin outlet. Before the ground water flows into a sewer line it needs to be filtered as free of pollutants as possible. These pollutants may include large debris such as sticks and leaves as well as soil.

In the past this filtration has been accomplished by placing a filter means in the mouth of the curb inlet. These devices often cause obstructions in the street and are subject to vandalism. For example Emery, U.S. Pat. No. 5,403,474 shows a containment of gravel that extends out into the street in front of the curb inlet. Other forms of curb inlet protection are designed to bar only large items from entering the catch basin. These do not filter out smaller pollutants or provide a means to retain these pollutants offsite of the street. For example, the approach described by Allen et al. U.S. Pat. No. 6,0154,489 shows a filter placed in the mouth of a curb inlet. This prevents large sized debris from entering the storm sewer system. The debris however, backs up into the street. In heavy flow conditions, storm water forces the filter open and allows the accumulated debris to enter the sewer system. There is no off-street containment of pollutants. McGowan U.S. Pat. No. 4,594,157 shows a clamp and screen that mounts inside the curb inlet. This provides no off-street containment of debris. The debris accumulates in the street upstream from the curb inlet. Other prior art refers to catch basin filters, which are not designed for curb inlet basins for example Logue Jr. U.S. Pat. No. 5,575,925.

The Drain Pack™ product brochure shows a filter basket installed below a curb inlet and essentially inside a curb inlet catch basin. This device appears to be designed to catch large pollutant items such as pop cans and sticks. The capacity of the basket is small and limited in size. The device does not have any means to convey the storm water from the inlet floor to the basket interior. Small pollutants will bypass the filter because the basket merely rests against the uneven cement basin wall without a seal. The basket is of a fixed length. There is no provision at the job site to expand the basket or series of baskets to a full width of the inlet opening. The device is attached to the exterior of the inlet mouth hanging from chains. This is subject to vandalism and expensive to install. The attachments appear to require drilling and alteration of the outsides of the inlet.

Other prior art is unnecessarily complex. For example Roy et al. U.S. Pat. No. 6,106,706 shows a pollutant filter apparatus that comprises an unnecessarily complex bypass means. The bypass is a moving part, which is subject to wear and to being jammed open with debris. During the winter, the movable part can freeze into position and cause the system to either not filter or backup storm water into the street. The hinged and spring-loaded bypass means is expensive to manufacture. The filter apparatus further comprises a permanently mounted structure inside the catch basin. This mounting structure is expensive to manufacture, install and remove. The catch basin is altered by screws, which require power tools to install. The apparatus cannot be adjusted on site to accommodate the various sizes of curb catch basins that are regularly encountered in the field.

Accordingly, what is needed is a filter system with a support structure comprising stationary parts. This system should be easy to install without the need for power tools, require no alteration of the catch basin, can be adjusted to fit catch basins of varying sizes and dimensions, and have none of the disadvantages of the foregoing prior art devices.

BRIEF SUMMARY OF THE INVENTION

The present invention comprises a filter and method for filtering storm water run-off comprising a removable filter basket assembly, a funnel comprising two planar sections to channel storm water into the basket assembly, and a support structure that holds the filter in place within the basin.

DETAILED DESCRIPTION OF THE INVENTION

Figure 1:
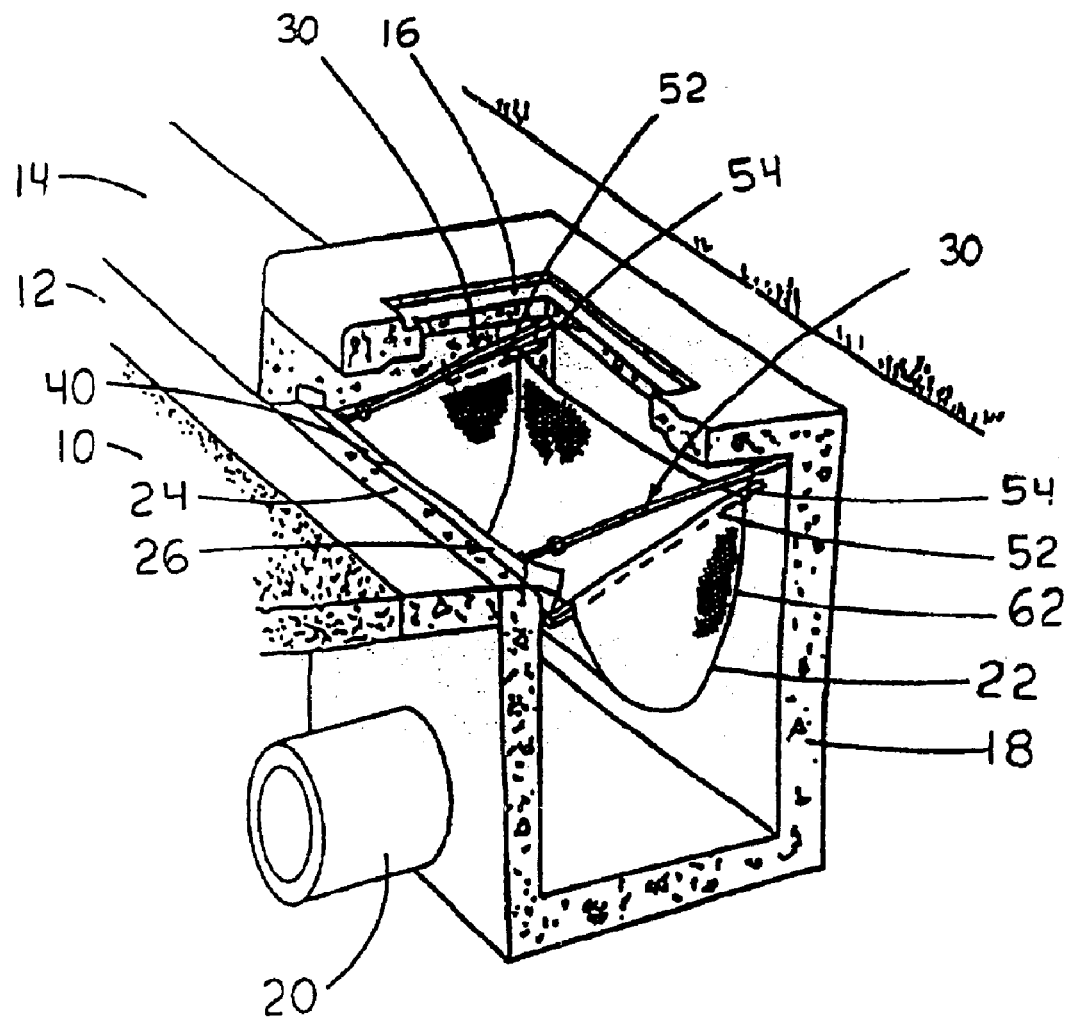
FIG. 1 is an elevated perspective view a preferred embodiment of the invention as installed in a typical curb inlet catch basin.
Figure 2:
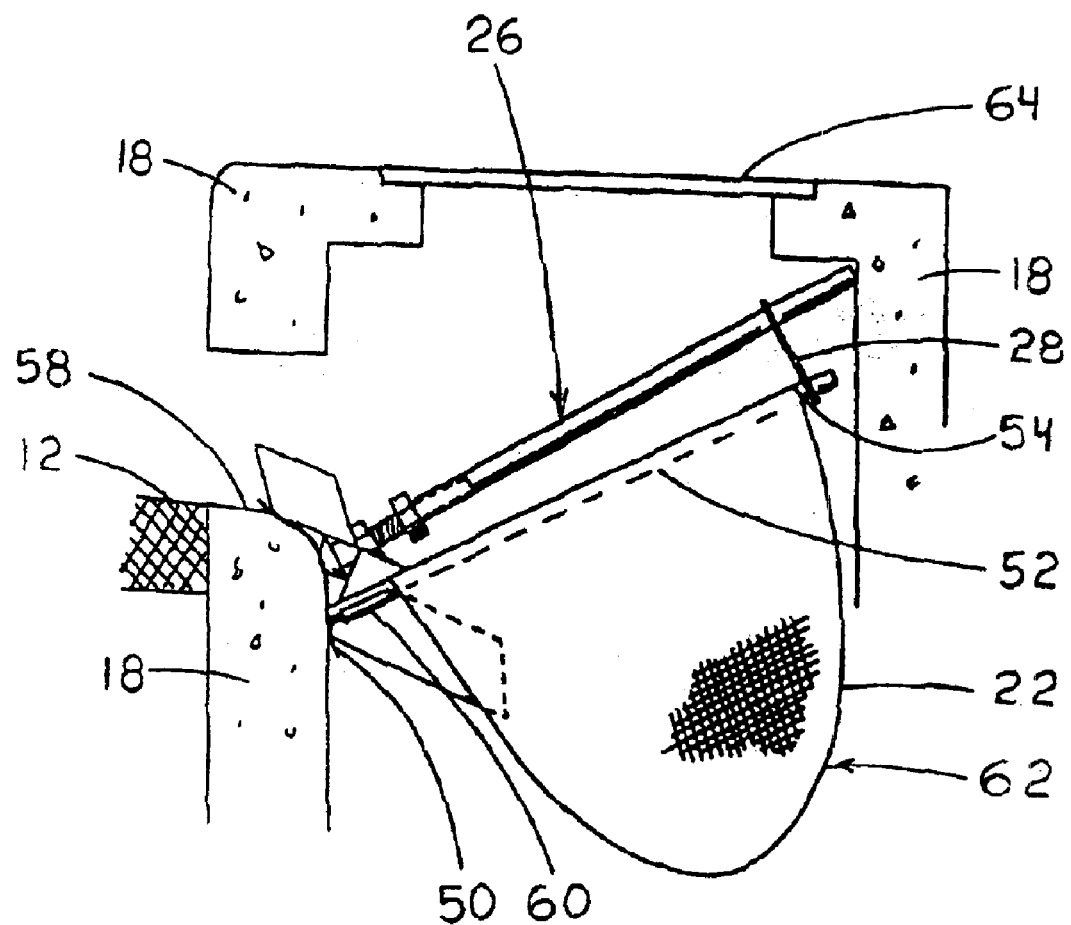
FIG. 2 is a side view of a preferred embodiment of the invention as installed in a typical curb inlet catch basin.
Figure 3:
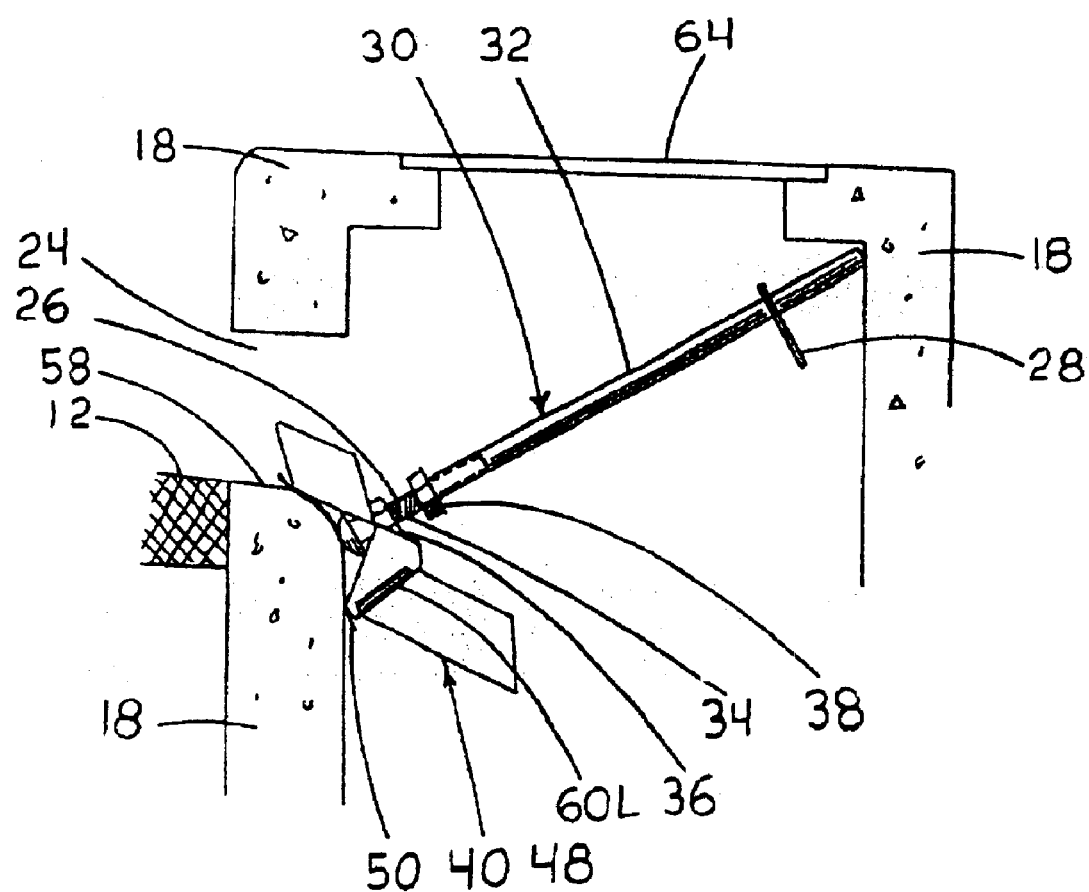
FIG. 3 is a side view of a preferred embodiment of the invention as installed in a typical curb inlet catch basin.
Figure 4:
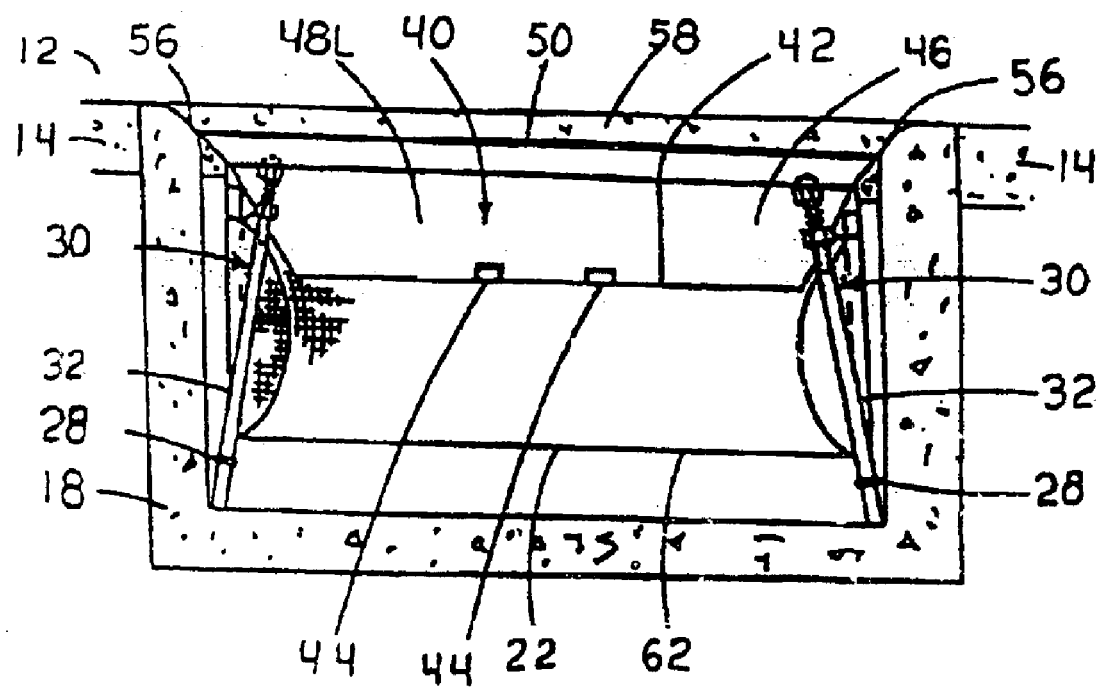
FIG. 4 is a top view of a preferred embodiment of the invention as installed in a typical curb inlet catch basin.
Figure 5:
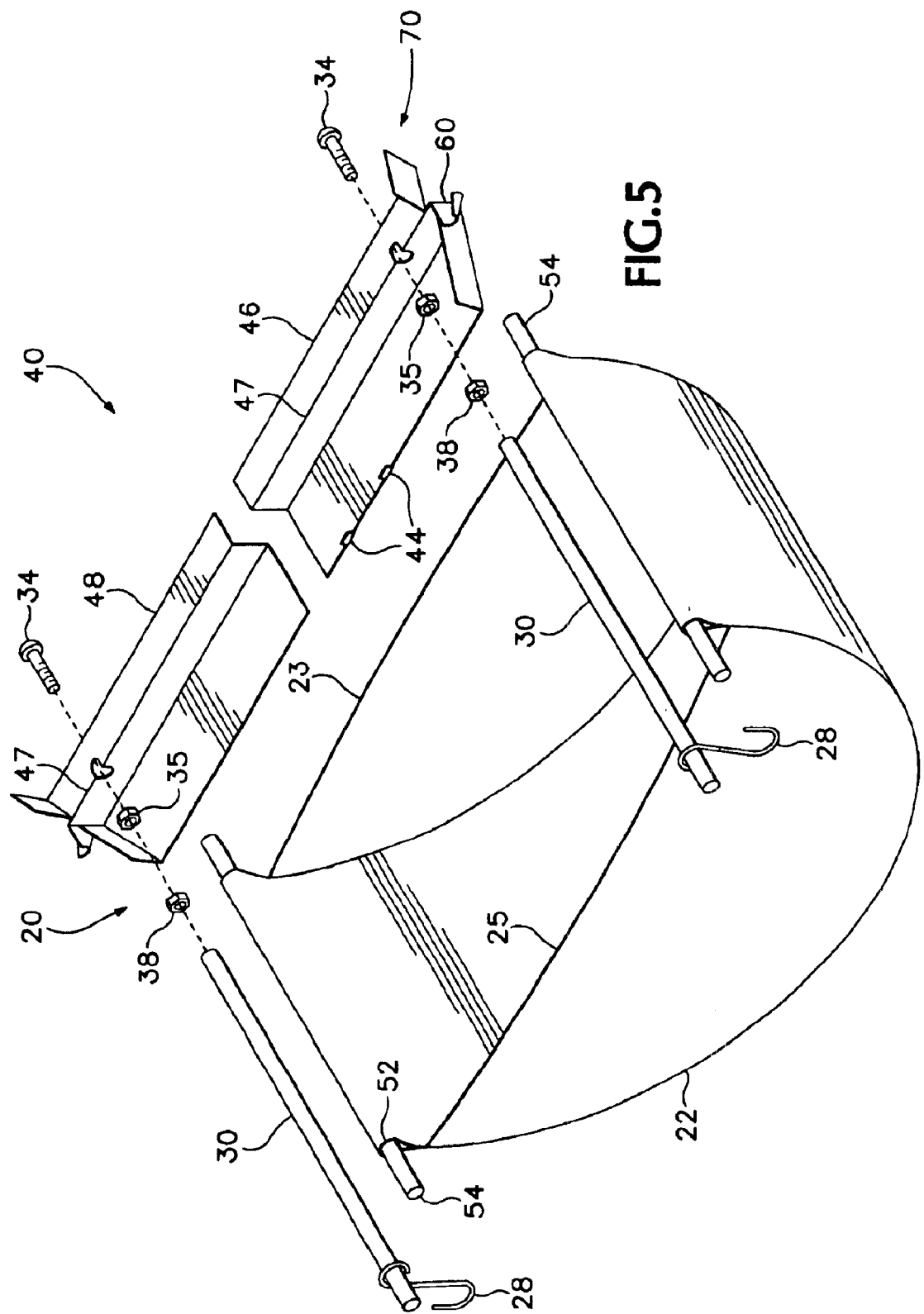
FIG. 5 is an elevated exploded view of a preferred embodiment of the invention.

FIGS. 1, 2, 3, and 4 show a preferred embodiment installed in a typical curb catch basin 18. Referring to FIG. 5, the preferred embodiment comprises a bag assembly 22 and a support structure 26.

The bag assembly comprises a filter basket 22 and a pair of insert rods 54. The basket is made of filter material with hydraulic openings smaller than the pollutants intended to be filtered from the storm water. This material allows the storm water to pass through while blocking various sizes of pollutants. The bag assembly is preferably made from a polypropylene geotextile fabric. However, this filter may be made of many types of materials, for example: cotton; burlap; stainless; fiberglass; or aluminum.

Rods 54 are inserted into bag assembly in sleeves 52. Each rod 54 may be made of "½" EMT.Rods 54 and with them the filter basket 22 are held in place by a support structure 26.

Structure 26 comprises a pair of expansion braces 30s and a water conveyance funnel 40, which further comprises plates 46 and 48. Braces 30 are expandable so as to span the distance between funnel 40 and the upper back wall of the curb inlet basin 18. Clamps 70 comprise galvanized carriage bolts 34. Bolts 34 extends through the angle peak 47 of the expansion plate 46 and 48 respectively. Bolts 34 are secured with nuts 36. Bolts 34 extend into the annular space of tubes 30. Tubes 30 may be made from ½" EMT. As previously stated funnel 40 comprises planar plates 47 and 48. Said plates my be made from 18 gage 50–52 aluminum sheet-metal. The plate 48 rests on top of the plate 46. Funnel 40 can thus expand to the full inner width of the basin inlet. Expansion alignment guides 44 maintain plates 46 and 48 in alignment. The entire funnel presses against the basin inlet floor with an intervening pad(not shown). The pad may be made from 8 oz. non-woven polypropylene geotextile fabric.

The supporting structure holds the bag assembly in place within the basin. Each inserted rod 54 is supported by the structure by rod cradles 60. Cradles 60 located at the outer sides of funnel 40. The other end of rod 60 rests inside hook 28 which are attached to braces 30. The bag assembly suspends below the structure between rods 54. The funnel and bag assembly may be unlinked. The bag assembly thus easily seperates from the funnel for removal, cleaning or maintenance.

Operation of the Preferred Embodiment

The preferred embodiment removes and retains storm water pollutants within a curb inlet catch basin. Storm water flows from the street 10, across the gutter 12, across a catch basin inlet floor 58, across the water conveyance funnel 40, into and through the filter basket 22, into the catch basin 18, and out the basin outlet 20. The filter basket 22 retains pollutants within while releasing the filtered storm water to flow downstream. The basket's filter material permits storm water to flow freely through basket 22 while the filter retains pollutants within the filter basket. The support structure holds the bag assembly in place and provides a conveyance funnel to channel the storm water into the filter basket. The two expansion braces urge funnel 40 against seal pad 50 (See FIG. 2) and the basin inlet floor.

The pressure of the braces rigidly fixes the position of the support structure inside of the basin. The lengthening of the expansion braces is created by varying the insertion depth of bolts 34 inside tubes 30. Nuts 38 are located on bolts 34. The insertion depth of bolts 34 is altered by the turning of nuts 38 against tubes 30 thereby lengthening or shortening the braces. When installed, the braces are lengthened until pressure is created between the funnel positioned against the basin inlet floor and the upper back basin wall. This fixes the structure rigidly in place inside the catch basin 18. The structure then is able to provide support for the bag filter 22 comprising the filter basket, bag sleeves 52 and insert rod 54. The basket is held in place by rods 54. The street side of the funnel can be equipped with structural barriers to prevent small children or large objects such as pop cans or tennis balls from passing beyond reach below the mouth of the curb inlet.

The invention easily installs into a catch basin. An operator can preassemble the support structure in two parts. The manhole cover 62 is removed. The portion of the structure associated with plate 48 is installed first. The remaining portion fo the structure then follows. The plate 48 slides over plate 46 until the outside opposite ends of the funnel press against the basin inlet sides 56. At first the plates are loosely set into place with only hand tightened braces. The plates may be further tightened with a small hand tool such as a pair of pliers. The funnel 40 conveys the storm water between the basin inlet floor 58 and the filter basket. The seal pad installs between the funnel and catch basin inlet. This prevents water from bypassing between the funnel and the catch basin inlet floor and sides. The entire support structure can be quickly and easily removed in reverse order.

The support structure remains a seperate piece from and does not become permanently attached to the catch basin. The integrity of the catch basin is not altered. The pad seal presses against only the surface of the inlet floor and the upper end of the braces press against only the inside surface of the basin back wall. The invention is rugged in construction and can serve well as a permanent filter installation.

The bag assembly 62 comprises rods 54 and filter basket 22. The manhole inlet 16 easily accommodates the installation, maintenance and replacement of the assembly. The assembly is best put together before being installed in the basin. The filter assembly folds together. The two inserted rods serve as handles to enable the operator to easily lower the bag filter through the manhole opening and into its resting place. The rods rest in place by gravity. Because the funnel and filter basket are not directly attached, the filter basket easily separates from below the funnel. For maintenance, the basket can be vacuumed out or lifted out and washed. The filter assembly folds together to enable it to easily pass up through the manhole opening during removal. To replace the basket, the operator simply removes the assembly from the basin. He then slides the rods out from the assembly and reinserts them into the new basket. The bag assembly is then lowered back into place.

Accordingly, the invention removes pollutants from storm water flowing into a curb inlet catch basin before the water is released through the catch basin's outlet. The filter and its support structure is easily installed, maintained, and removed. The bag assembly can be removed while leaving the support structure in place by removing the assembly out from its resting place. Furthermore the filter has the additional advantages in that it provides a catch basin filter system that can be easily adjusted at the work site to fit curb inlet catch basins of varying sizes and dimensions. The filter system provides a filter which has no moving mechanical parts that cannot be easily jammed with debris. The system being entirely located inside the catch basin does not interfere with the normal traffic flow of street vehicles. The system is not accessible though the curb inlet and thus resistant to vandalism. The system permits many types of filter materials to be easily interchanged for various degrees of filtration. A chemical absorbent medium can be placed inside the system for the removal of such pollutants as hydrocarbons. The system can serve as either a short term or permanent Storm Water Prevention Plan measure.

Although the description above contains many specifications, these should not be construed as limiting the scope of the invention but as merely providing illustrations of some of the presently preferred embodiments of this invention. Thus the scope of the invention should be determined the appended claims and their legal equivalents, rather than by the examples given.

We claim:

1. A drain basin filtering device, located within a curb side storm water inlet basin, wherein said basin further comprises at least one pair of opposing interior surfaces, comprising:

a) a funnel comprising a first plate and a second plate, said first plate laying on top of said second plate, said plates each having an outside edge and an inside edge, said outside edge having a filter bag support member rest, wherein said plates interlockingly fit and are slidably in relation to each other;

b) an expandable structural support member, said structural support member, having a first and second distal ends, said first distal end attached proximate to said plate's outside edge, said member further comprising screw means to urge said second distal end and said plate to exert opposing forces against said opposing pair or interior surfaces of said curb basin;

c) a filter bag support hook, said support hook being arranged and restrained proximate to said second distal end of said support member;

d) a filter bag assembly, said filter bag assembly comprising a filter bag having an upper periphery, an open top, and a closed bottom, and a pair of support sleeves located at said upper periphery; and e) a pair of bag support members each member having a first end and a second end, said bag support members being inserted into said support sleeves, wherein said bag assembly is suspended within said basin between said structural support members by resting said first end of said bag support members on said filter bag support member rest and resting said second end of said bag support member on said filter bag support hook.

2. The drain basin filtering device of claim 1, wherein said expandable structural support member further comprises a tube having a first distal end and a second distal end, a bolt having a threaded portion and a head portion, and a nut threaded onto said threaded portion of said bolt and located flushed against said first distal end of said tube, said threaded portion of said bolt being inserted into the annular space of said tube wherein said member elongates or contracts when said nut is rotated along the threads of said bolt.

* * * * *